United States Patent [19]

Meixner et al.

[11] Patent Number: 5,136,009
[45] Date of Patent: Aug. 4, 1992

[54] ALIPHATIC POLYURETHANES CONTAINING ACRYLOYL GROUPS AND A PROCESS FOR THEIR PREPARATION

[75] Inventors: Jürgen Meixner, Krefeld; Wolfgang Fischer, Meerbusch; Klaus Noll, Cologne, all of Fed. Rep. of Germany

[73] Assignee: Bayer Aktiengesellschaft, Leverkusen Bayerwerk, Fed. Rep. of Germany

[21] Appl. No.: 751,467

[22] Filed: Aug. 29, 1991

[30] Foreign Application Priority Data

Sep. 4, 1990 [DE] Fed. Rep. of Germany ....... 4027971

[51] Int. Cl.$^5$ ............................................. C08G 18/30
[52] U.S. Cl. ..................................... 528/49; 560/158; 526/301; 252/182.18; 522/90
[58] Field of Search ................. 560/158; 526/301; 522/90; 252/182.18; 528/49

[56] References Cited

U.S. PATENT DOCUMENTS

| | | | |
|---|---|---|---|
| 3,782,961 | 1/1974 | Takashashi et al. | 96/115 |
| 4,052,282 | 10/1977 | Kubushiro | 522/90 |
| 4,131,602 | 12/1978 | Hodakowski et al. | 528/49 |
| 4,133,723 | 1/1979 | Howard | 204/15 |
| 4,225,695 | 9/1980 | Schuster et al. | 528/75 |
| 4,250,248 | 2/1981 | Faust | 430/284 |
| 4,296,196 | 10/1981 | Faust | 430/271 |

FOREIGN PATENT DOCUMENTS

| | | |
|---|---|---|
| 122611 | 10/1984 | European Pat. Off. . |
| 153520 | 9/1985 | European Pat. Off. . |
| 168173 | 1/1986 | European Pat. Off. . |
| 290623 | 11/1988 | European Pat. Off. . |
| 1159551 | 7/1969 | United Kingdom . |
| 1159552 | 7/1969 | United Kingdom . |
| 2085023 | 4/1982 | United Kingdom . |

*Primary Examiner*—Maurice J. Welsh
*Assistant Examiner*—Rachel Johnson
*Attorney, Agent, or Firm*—Joseph C. Gil; Thomas W. Roy

[57] ABSTRACT

The present invention relates to aliphatic polyurethanes which contain acryloyl groups, have a viscosity at 23° C. of 1000 to 300,000 mPa.s as an 80% by weight solution in butyl acetate and are based on the reaction product (at an NCO/OH equivalent ratio 0.5:1 to 1:1) of a) 1.0 mole of a polyisocyanate component containing at least 50 equivalent percent, based on NCO equivalents, of 1,6-diisocyanato-2,2,4-trimethylhexane and/or 1,6-diisocyanato-2,4,4-trimethylhexane with b) 0.7 to 1.5 moles of at least one monohydric alcohol having a molecular weight of 116 to 300 and containing acryloyl groups and c) 0.2 to 0.6 moles of at least one polyhydric alcohol having a molecular weight of 92 to 200.

The present invention also relates to a process for the preparation of these aliphatic polyurethanes.

2 Claims, No Drawings

ALIPHATIC POLYURETHANES CONTAINING ACRYLOYL GROUPS AND A PROCESS FOR THEIR PREPARATION

BACKGROUND OF THE INVENTION

1. Field of the Invention

The present invention relates to new polyurethanes which contain acryloyl groups and can be converted into crosslinked products by radiation curing and to a process for their preparation.

2. Description of the Prior Art

Polyurethanes which contain acryloyl groups and are known and may be obtained, as described, for example, in DE-OS (German Published Specification) 1,644,798, DE-OS 2,115,373 or DE-OS 2,737,406, as the reaction product of, inter alia, polyisocyanates and hydroxyalkyl acrylates. They are cured with the aid of high-energy rays, such as UV rays or electron beams, and are used for coating, for example, wood or for the production of coatings for graphical purposes.

These so-called urethane acrylates have a high viscosity. To reduce their viscosity, polyether alcohols are often used for their preparation, in addition to hydroxyalkyl acrylates. However, even if only (cyclo)aliphatic polyisocyanates are employed, the resulting products are not stable to weathering.

An object of the present invention is to provide aliphatic polyurethanes containing acryloyl groups which have viscosities suitable for processing as surface coating binders without the necessity of incorporating ether groups into. It is an additional object of the present invention to provide aliphatic polyurethanes which are distinguished by a high reactivity under UV irradiation.

These objects may be achieved by providing the aliphatic polyurethanes containing acryloyl groups according to the invention which are described in more detail below.

SUMMARY OF THE INVENTION

The present invention relates to aliphatic polyurethanes which contain acryloyl groups, have a viscosity at 23° C. of 1000 to 300,000 mPa.s as an 80% by weight solution in butyl acetate and are based on the reaction product (at an NCO/OH equivalent ratio 0.5:1 to 1:1) of a) 1.0 mole of a polyisocyanate component containing at least 50 equivalent percent, based on NCO equivalents, of 1,6-diisocyanato-2,2,4-trimethylhexane and/or 1,6-diisocyanato-2,4,4-trimethylhexane with b) 0.7 to 1.5 moles of at least one monohydric alcohol having a molecular weight of 116 to 300 and containing acryloyl groups and c) 0.2 to 0.6 moles of at least one polyhydric alcohol having a molecular weight of 62 to 2000.

The present invention also relates to a process for the preparation of aliphatic polyurethanes which contain acryloyl groups and have a viscosity at 23° C. of 1000 to 300,000 mPa.s as an 80% by weight solution in butyl acetate by reacting at an NCO/OH equivalent ratio 0.5:1 to 1:1 a) 1.0 mole of a polyisocyanate component containing at least 50 equivalent percent, based on NCO equivalents, of 1,6-diisocyanato-2,2,4-trimethylhexane and/or 1,6-diisocyanato-2,4,4-trimethylhexane with b) 0.7 to 1.5 moles of at least one monohydric alcohol having a molecular weight of 116 to 300 and containing acryloyl groups and c) 0.2 to 0.6 moles of at least one polyhydric alcohol having a molecular weight of 62 to 2000.

DETAILED DESCRIPTION OF THE INVENTION

In accordance with the present invention the term "butyl acetate" means "n-butyl acetate."

Polyisocyanate component a) contains at least 50, preferably of at least 70 and more preferably of 100 equivalent percent, based on NCO equivalents, of 1,6-diisocyanato-2,2,4-trimethylhexane and/or 1,6-diisocyanato-2,4,4-trimethyl-hexane. This diisocyanate component is in general a commercial mixture which contains approximately equal parts by weight of the two isomers.

Polyisocyanate component a) can also contain up to 50 NCO equivalent percent, preferably up to 30 NCO equivalent percent, of other polyisocyanates containing aliphatically and/or cycloaliphatically bound isocyanate groups. These other polyisocyanates include 1,6-diisocyanatohexane, 1-isocyanato-3,3,5-trimethyl-5-isocyanatomethyl-cyclohexane (IPDI), polyisocyanates based on IPDI or 1,6-diisocyanatohexane which contain isocyanurate groups, or polyisocyanates based on IPDI or 1,6-diisocyanatohexane and polyhydric alcohols (such as trimethylolpropane and/or propylene glycol) and contain urethane groups.

Component b) is based on a monohydric alcohol containing acryloyl groups and mixtures of these alcohols. These are understood to be esters containing one free hydroxyl group per molecule and prepared by reacting acrylic acid with polyhydric alcohols. The esters have a molecular weight of 116 to 300, preferably 116 to 230. Examples of such ethylenically unsaturated esters include 2-hydroxyethyl acrylate, 1-methyl-2-hydroxyethyl acrylate, 2- and 3-hydroxypropyl acryl 2-, 3- and 4-hydroxybutyl acrylate. The addition products of 1 mole of ε-caprolactone with 1 mole of the previously mentioned hydroxyalkyl esters may also be used.

Polyol component c) is based on at least one polyhydric alcohol having a molecular weight of 62 to 2000. Examples include monomeric alcohols having a molecular weight 92 to 200 which are at least trihydric such as glycerol, trimethylolpropane, pentaerythritol and/or sorbitol. Also suitable are polyester polyols having a maximum molecular weight of 2000, preferably 1000, which may be obtained by the reaction of polyhydric alcohols and polybasic acids or anhydrides of polybasic acids in known manner. It is also possible to use relatively small amounts of diols, such as ethylene glycol, thiodiglycol or hexanediol. However, the diols should be used in amounts of less than 50 hydroxyl equivalent percent, based on the hydroxyl equivalents of component c).

The polyurethanes can be prepared by reaction of the starting components in the presence or absence of solvents which are inert towards isocyanates such as acetone, ethyl acetate, butyl acetate, low molecular weight esters of (meth)acrylic acids or mixtures of such solvents. The reaction temperature is preferably 20° to 100° C., more preferably 40° to 80° C. The reaction is preferably carried out as a batch process. In accordance with one embodiment polyisocyanate component a) is initially introduced into the reaction vessel and components b) and c) are added in succession. In accordance with another embodiment components b) and c) are initially introduced into the reaction vessel and the polyisocyanate component a) is subsequently added. In all cases, the reaction is carried out under mild conditions at an NCO/OH equivalent ratio of 0.5:1 to 1:1 until the NCO content has fallen to below 0.1% by weight.

The addition reaction resulting in the polyurethane can be accelerated in known manner by the addition of a suitable catalyst, e.g., tin octoate, dibutyltin dilaurate or tertiary amines such as dimethylbenzylamine. Alternatively, the urethane acrylate obtained as the reaction product can be protected from premature and undesirable polymerization by the addition of suitable inhibitors and antioxidants such as phenols and/or hydroquinones, in amounts of in each case 0.001 to 0.3% by weight, based on the urethane acrylate. These auxiliaries can be added before, during and/or after the reaction.

The products according to the invention are clear, colorless liquids which preferably have a viscosity of 5000 to 150,000 mPa.s at 23° C. as an 80% by weight solution in butyl acetate.

The surface coatings prepared from the products according to the invention can contain the known auxiliaries and additives of surface coating technology.

These include fillers, pigments, dyestuffs, thixotropic agents, lubricants, matting agents and flow control agents. These additives and auxiliaries can be used in the customary amounts. The polyurethanes containing acryloyl groups can also be dissolved in known surface coating solvents, mixed with copolymerizable monomers or employed as an emulsion in water.

Examples of suitable solvents include butyl acetate, cyclohexane, acetone, toluene or mixtures of such solvents.

Examples of suitable copolymerizable monomers are organic compounds which contain at least one copolymerizable olefinic double bond per molecule and have a viscosity of not more than 500 mPa.s at 23° C. Suitable monomers include styrene, 1,6-hexanediol diacrylate, trimethylolpropane triacrylate or N-vinylpyrrolidone.

The inert solvents and also the copolymerizable monomers can be employed in amounts in each case of up to 100% by weight, preferably up to 50% by weight, based on the weight of the polyurethanes containing acryloyl groups.

It is also possible to simultaneously use both inert solvents and copolymerizable monomer.

If the polyurethanes containing acryloyl groups are to be processed from an aqueous emulsion, the emulsion can be prepared, for example, with the aid of external emulsifiers and if appropriate the customary auxiliaries used in emulsion technology.

Emulsifiers which are suitable for this purpose are known and described, for example, in Ullmanns Encyclopadie der tech. Chemie (Ullmanns Encyclopaedia of Industrial Chemistry), Volume 10, 4th Edition, chapter on Emulsions, page 449 et seq.

Preferred emulsifiers are copolymerizable polyurethane emulsifiers containing acryloyl groups, such as those described in DE-OS (German Published Specification) 3,900,257.

The aqueous emulsions contain 10 to 70% by weight, preferably 30 to 70% by weight, of the polyurethanes containing acryloyl groups according to the invention. The emulsions can be prepared by stirring water into the mixture of polyurethane acrylate according to the invention and emulsifier, for example by simple stirring or by means of a dissolver.

To form a finely divided emulsion, it is advantageous to add the water in portions at temperatures below 30° C. Oil-in-water emulsions are formed under optimum shear.

In all the variants of the process according to the invention, the curing (if appropriate after evaporation of volatile auxiliaries, such as inert solvents or water) is carried out by means of high-energy radiation, such as UV light, electron beams or gamma rays.

In the case of crosslinking by means of UV irradiation, it is necessary to add photoinitiators to the coating compositions. Suitable photoinitiators are known and include the compounds described, for example, in the monograph by J. Korsar, Light-Sensitive Systems, J. Wiley & Sons, New-York—London—Sydney 1965.

Preferred photoinitiators are benzoin ethers such as benzoin isopropyl ether, benzil ketals such as benzil dimethyl ketal, and hydroxyalkylphenones such as 2-hydroxy-2-methyl-phenylpropane-1-one.

The photoinitiators are employed in amounts of 0.1 to 10% by weight, preferably 0.1 to 5% by weight, based on the weight of the reaction products, depending on the intended purpose of the composition according to the invention. The photoinitiators can be used individually or in combination with one another to obtain advantageous synergistic effects.

The coating compositions or surface coatings prepared using the polyurethanes according to the invention as binders are suitable for coating diverse substrates such as paper, cardboard, leather, wood, plastics, nonwovens, textiles, ceramic materials, mineral materials, glass, metal, imitation leather and photographic materials (for example, paper provided with a photographic layer).

In the following examples, all the percentages and amounts are by weight unless otherwise indicated.

EXAMPLES

The amount of component a) set forth in Table 1 was dissolved, together with 0.2% of tin dioctoate and 0.1% of 2,6-di-t-butyl-p-cresol, in butyl acetate (in an amount to provide a solids content of 80%) and the solution was heated to 50° C. while air was passed through. The amount of component b) set forth in Table 1 was then added dropwise and finally the amount of component c) set forth was added dropwise. During this procedure, the reaction temperature was kept at a maximum of 60° C., if necessary by external cooling. The mixture was then kept at 60° C. until the NCO content had fallen to less than 0.1%

TABLE 1

|  | Examples | | | | Comparison Example | | |
|---|---|---|---|---|---|---|---|
|  | 1 | 2 | 3 | 4 | 5 | 6 | 7 |
|  | Amount weighed out (moles) | | | | | | |
| Component a) | | | | | | | |
| Trimethyl-1,6-diisocyanato- | 1.0 | 1.0 | 1.0 | 1.0 | — | — | 1.0 |

TABLE 1-continued

|  | Examples | | | | Comparison Example | | |
| --- | --- | --- | --- | --- | --- | --- | --- |
|  | 1 | 2 | 3 | 4 | 5 | 6 | 7 |
| hexane (50/50 mixture of 2,2,4- and 2,4,4-trimethyl isomers |  |  |  |  |  |  |  |
| 1,6-Diisocyanatohexane | — | — | — | — | 1.0 | — | — |
| Isophorone diisocyanate | — | — | — | — | — | 1.0 | — |
| Component b) |  |  |  |  |  |  |  |
| Hydroxyethyl acrylate | 1.0 | — | 0.8 | 1.0 | 1.0 | 1.0 | 2.0 |
| 4-Hydroxybutyl acrylate | — | 1.0 | — | — | — | — | — |
| Component c) |  |  |  |  |  |  |  |
| Trimethylolpropane | 0.33 | 0.33 | 0.34 | — | 0.33 | 0.33 | — |
| Thiodiglycol | — | — | 0.13 | — | — | — | — |
| Pentaerythritol | — | — | — | 0.25 | — | — | — |
| Viscosity (23° C., mPa.s) | 35500 | 5700 | 25500 | 97600 | crys-talline | not measur-able (pasty) | 160 |

USE EXAMPLES

The product from Comparison Example 5 was not suitable for use as a coating because of its crystallinity. For clarity, the numbering of the use examples corresponds to the previous numbering of the preparation examples.

The products of the examples according to the invention and Comparison Examples 6 and 7 were adjusted with butyl acetate to a processing viscosity of about 50 seconds (DIN cup 4 mm, 23° C.), and in each case 5% of benzophenone, based on the weight of the urethane acrylate, was added. After the surface coating films had been applied to cardboard (application thickness of 10 μm), the coated substrate was passed through the beam of a Hanovia lamp (80 W/cm, 10 cm distance). The value given for the reactivity in Table 2 indicates the belt speed at which a coating which was resistant to solvents and scratching was achieved.

"Resistant to solvents" in this case means that the surface coating film still looked perfect after at least 20 double rubs with a cloth soaked in butyl acetate.

TABLE 2

|  | Examples | | | | Comparison Example | |
| --- | --- | --- | --- | --- | --- | --- |
|  | 1 | 2 | 3 | 4 | 6 | 7 |
| Reactivity (m/minute) | 35 | 20 | 20 | 30 | <10 | <10 |

What is claimed is:

1. An aliphatic polyurethane which contains acryloyl groups, has a viscosity at 23° C. of 1000 to 300,000 mPa.s as an 80% by weight solution in butyl acetate and comprises the reaction product (at an NCO/OH equivalent ratio of 0.5:1 to 1:1) of
   a) 1.0 mole of a polyisocyanate component containing at least 50 equivalent percent, based on NCO equivalents, of 1,6-diisocyanato-2,2,4-trimethylhexane and/or 1,6-diisocyanato-2,4,4-trimethylhexane with
   b) 0.7 to 1.5 moles of at least one monohydric alcohol having a molecular weight of 116 to 300 and containing acryloyl groups and
   c) 0.2 to 0.6 moles of a polyhydric alcohol component consisting essentially of at least one compound having a molecular weight of 92 to 200 and at least 3 hydroxyl groups and up to 50 hydroxyl equivalent percent, based on the hydroxyl equivalents of component c), of a diol.

2. A process for the preparation of an aliphatic polyurethane containing acryloyl groups and having a viscosity at 23° C. of 1000 to 300,000 mPa.s as an 80% by weight solution in butyl acetate which comprises reacting at an NCO/OH equivalent ratio of 0.5:1 to 1:1
   a) 1.0 mole of a polyisocyanate component containing at least 50 equivalent percent, based on NCO equivalents, of 1,6-diisocyanato-2,2,4-trimethylhexane and/or 1,6-diisocyanato-2,2,4-trimethylhexane with
   b) 0.7 to 1.5 moles of at least one monohydric alcohol having a molecular weight of 116 to 300 and containing acryloyl groups and
   c) 0.2 to 0.6 moles of a polyhydric alcohol component consisting essentially of at least one compound having a molecular weight of 92 to 200 and at least 3 hydroxyl groups and up to 50 hydroxyl equivalent percent, based on the hydroxyl equivalents of component c), of a diol.

* * * * *